(No Model.) 2 Sheets—Sheet 1.
W. MORIN.
CULTIVATOR AND GUIDE ATTACHMENT.
No. 453,725. Patented June 9, 1891.
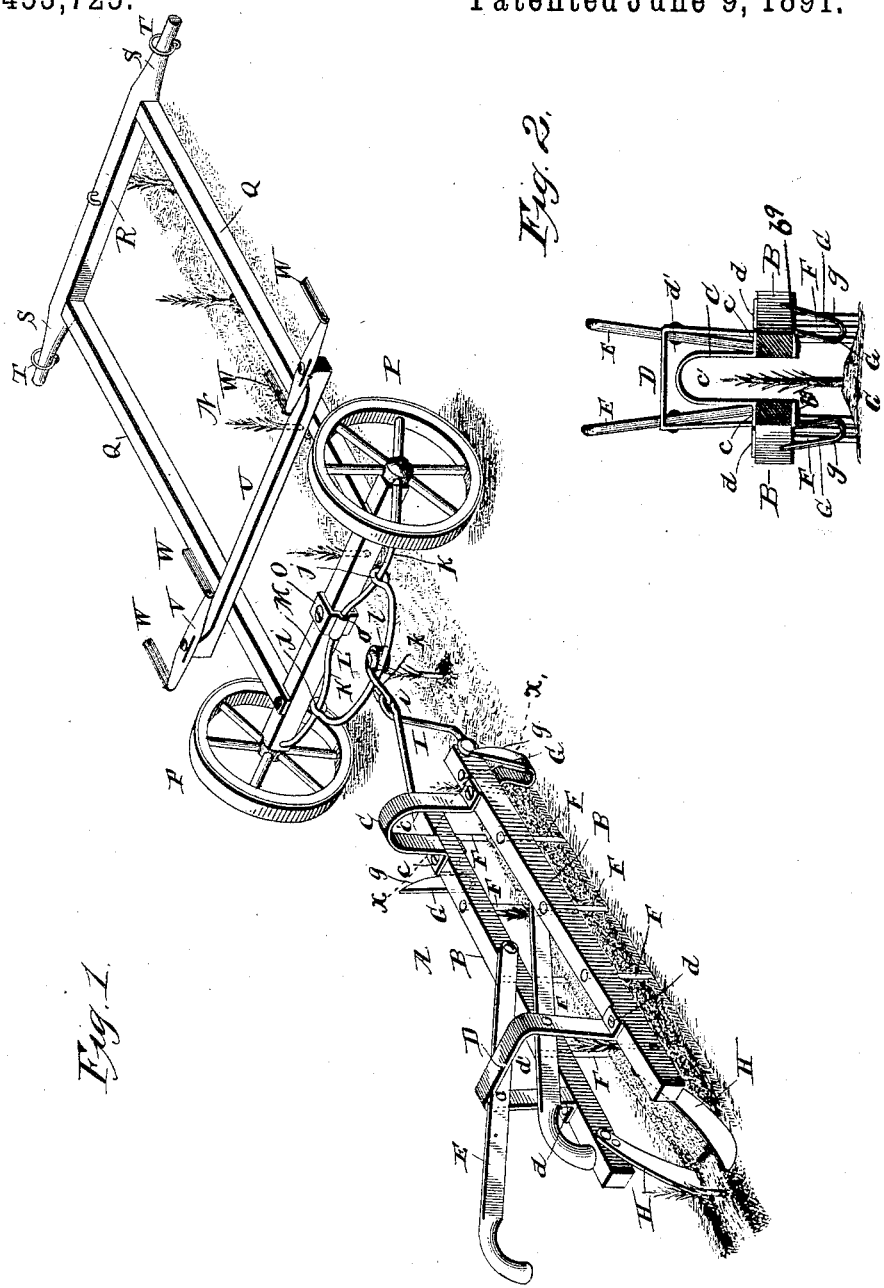
Witnesses
G. Y. Thorpe
H. E. Price
Inventor
W. Morin
By his Attorneys
Higdon & Higdon

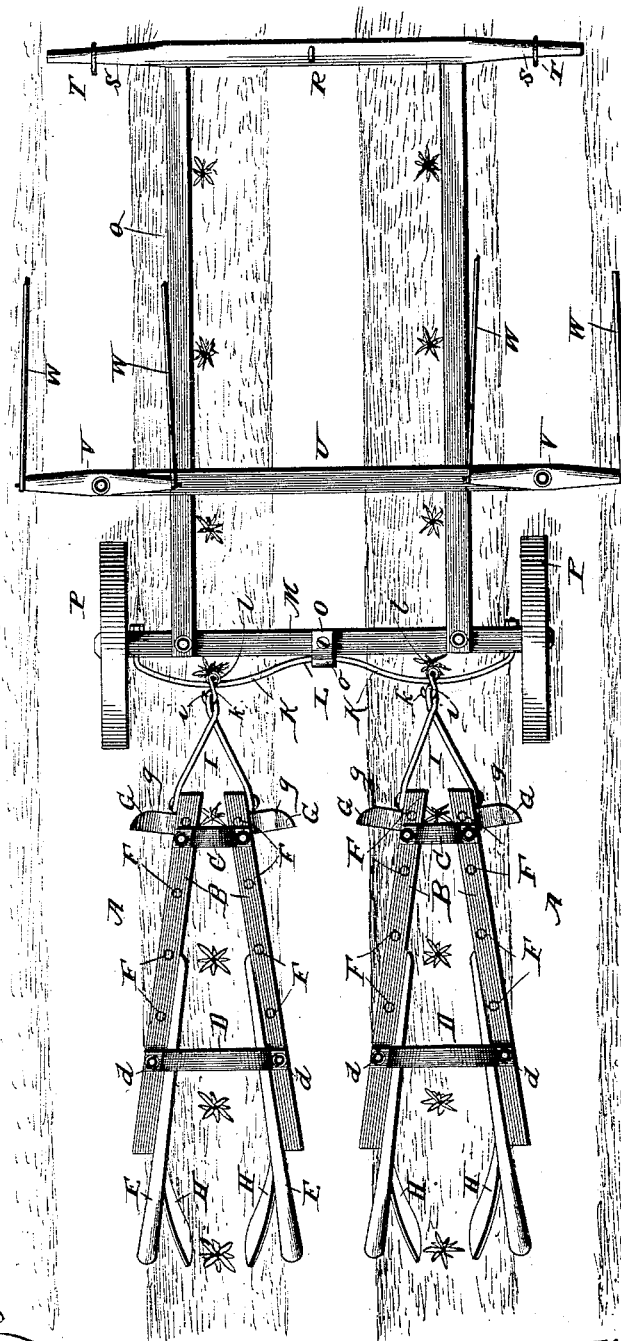

UNITED STATES PATENT OFFICE.

WILLIAM MORIN, OF CAMDEN POINT, MISSOURI.

CULTIVATOR AND GUIDE ATTACHMENT.

SPECIFICATION forming part of Letters Patent No. 453,725, dated June 9, 1891.

Application filed November 3, 1890. Serial No. 370,196. (No model.)

*To all whom it may concern:*

Be it known that I, WILLIAM MORIN, of Camden Point, Platte county, Missouri, have invented certain new and useful Improvements in Cultivators and Guide Attachments Thereto, of which the following is a full, clear, and exact description, reference being had to the accompanying drawings, forming a part hereof.

My invention relates to improvements in cultivators and attachments thereto; and it consists in the novel combination and arrangement of devices, as will be fully set forth hereinafter, and particularly pointed out in the claims.

My object is to provide an attachment (to which two horses are to be attached) so constructed that two cultivators arranged side by side and adapted to cultivate two adjacent rows of corn at the same time may be suitably secured to the rear end of said attachment, my object in attaching the two cultivators being to accomplish double the work of two or an amount equal to that done by four horses with single cultivators.

The cultivator is so arranged that the wheels travel immediately in the rear of the horses, who travel on the adjacent uncultivated ground on either side of the inclosed rows of corn, as will be readily understood. The cultivators connected to the rear of the attachment consist of two longitudinal bars provided with the depending cultivating-teeth adapted to furrow or stir the earth on either side of the hills of corn.

Secured suitably near the rear end of longitudinal beams are guide-arms or knives adapted to force the loose earth caused by the furrowing of the ground by the teeth depending from either side beam toward the corn, as illustrated. I have also provided cutting-arms on either side to clear away the weeds.

Referring to the drawings which illustrate this invention, Figure 1 is a perspective view of the invention in operative position, showing only one cultivator. Fig. 2 is a vertical section on line $x\,x$ of Fig. 1, looking toward the rear. Fig. 3 is a top plan view of the invention, showing two cultivators attached to the rear of the attachment.

Similar letters refer to similar parts in all the figures, in which—

A represents the cultivators, consisting of the longitudinal side beams B B, connected together at their forward ends by inverted- U-shaped brackets C, the lateral arms $c$ of which are adapted to be bolted or otherwise secured to the upper surfaces of the beams B B, the loop-shaped portions $c'$ extending upward for a suitable distance, the object of which will be described hereinafter.

The enlarged castings or brackets D are provided with the lateral arms $d$, by means of which they are bolted to the upper surfaces of the beams B near their rear ends, and are also provided with the upwardly-extending loops $d'$, as shown.

Secured at their inner ends to the inner side of the beams B a suitable distance in advance of the brackets D are the handle-bars E E, which extend rearwardly in an inclined upwardly direction, and are bolted to the inner sides of the side arms of the bracket D, depending cultivator-teeth F extending vertically from the beams B at suitable intervals, which are adapted, when the cultivator is in motion, to furrow or loosen the earth on either side of the corn to be cultivated.

Cultivating-knives G, provided with short horizontal arms $b^9$, depend a suitable distance toward the ground, and are then bent upward, being sharpened at $g$, as shown, at their forward edges. Securely bolted near the rear end of the inner side of the beams B are the upper ends of the guide-arms H, which incline to the rear at a suitable angle and are bent inward slightly at their lower ends, as shown.

Pivotally secured to the forward outer sides of the beams B are the rear ends of the V-shaped clevises I, which are bent to form the loops $i$, engaged by the hooks $k$, secured at their forward ends to the grooved rollers $l$, adapted to travel on the curved arms or portions K K of a rod L, which is permanently secured at either end in the rear side of the axle or cross-beam M of the attachment N. The middle portion of the said rod L is loosely inclosed in the loop of a bracket O, which is bolted to the upper and lower sides of the cross-beam M.

Journaled at either end of this cross-beam or axle are the wheels P. Longitudinal beams Q, parallel with each other, are bolted at their rear ends to the cross-beam M, and connected together at their forward ends by the transverse bar R, the extending portions S of which are decreased, as shown, and provided with the rings or loops T.

Securely bolted or otherwise secured to the upper surface of the longitudinal beams Q of the attachment a suitable distance in advance of the axle is a transverse beam U, provided at either end on its upper surface with the singletree V, to which the traces W of the harness are attached.

The loops or rings T are designed to be attached to the breast-strap of the harness, and thus support the forward end of the attachment in its elevated position.

In Fig. 1 I show a single cultivator, as described, and having the loop $i$ of the V-shaped clevis I, engaging loosely the rearwardly-extending hook $k$, attached at its front end to the roller $l$, adapted to travel on the curved rod J, the ends of which are provided with the small loops or eyelets $j$, inclosing and adapted to operate upon the curved portions K of rod L, as illustrated.

The advantage of using the attachment in connection with a single cultivator is to afford a means of controlling the horses more effectually than when attached directly to the cultivator, and also being connected to the attachment, as shown, the cultivator is less liable from any sudden movement of the horses to be displaced from its position relative to the corn, and therefore to endanger the same.

Having thus fully described my invention, what I claim as new, and desire to secure by Letters Patent, is—

1. A cultivator consisting of the longitudinally-extending beams B B, tied or connected together by the inverted-U-shaped brackets C D, the handles secured at their forward ends to the beams J and to the inner sides of bracket D, the teeth F, lateral knives G, having horizontal arms thereof secured to the under sides near the forward ends of the beams B, being then bent downward and upward and sharpened at their edges, as described, and the rearwardly and downwardly extending guide-arms H, bent inward near their lower ends, substantially as and for the purpose set forth.

2. The combination of the two cultivators, constructed as described, with the guide attachment N, provided with the transversely-extending beam or axle M, having supporting-wheels P, journaled at opposite ends thereof, forwardly-extending parallel beams Q, connected together at their forward ends by the transverse bar R and secured at their rear ends to transverse beam or axle M and to the cultivator-frames through the medium of a pivotal clevis I, hook $k$, grooved roller $l$, and rod L, substantially as and for the purpose set forth.

3. The attachment N, consisting of the transverse beam or axle M, transverse bar R, connected together by the longitudinal bars Q, the axle having journaled on its opposite ends the supporting-wheels P and provided at its middle with the looped bracket O, holding securely the central portion of a rod L, which, curving laterally from said bracket on either side, has its forward ends secured near the opposite ends of the transverse axle M, the grooved rollers $l$, and hook $k$, engaging loops $i$ of the clevises I, secured to the cultivators, substantially as described.

4. The combination of a cultivator, constructed as described, with a guide attachment N, provided with the transversely-extending beam or axle M, having supporting-wheels P, journaled at opposite ends thereof, forwardly-extending parallel beams Q, connected together at their forward ends by the transverse bar R and secured at their rear ends to transverse beam or axle M, and a cultivator attached to the said axle through the medium of a pivotal clevis I, hook $k$, grooved roller $l$, curved rod J, and the rod L, substantially as described.

In testimony whereof I affix my signature in presence of two witnesses.

WILLIAM MORIN.

Witnesses:
W. S. PERRIN,
M. S. HARDESTY.